(12) United States Patent
Kordecki

(10) Patent No.: US 6,323,643 B1
(45) Date of Patent: Nov. 27, 2001

(54) ROTARY POSITION SENSOR HAVING A SEMI-PARABOLIC MAGNET

(75) Inventor: David Kordecki, Austin, TX (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/521,041

(22) Filed: Mar. 8, 2000

(51) Int. Cl.⁷ .............................. G01B 7/30; G01R 33/06
(52) U.S. Cl. ............................ 324/207.2; 324/207.25; 324/207.22
(58) Field of Search .......................... 324/207.2, 207.21, 324/207.22, 207.24, 207.25, 207.26; 338/32 R, 32 H

(56) References Cited

U.S. PATENT DOCUMENTS

| | | |
|---|---|---|
| 3,112,464 | 11/1963 | Ratajski . |
| 4,570,118 | 2/1986 | Tomczak . |
| 4,726,338 | 2/1988 | Decker . |
| 4,744,343 | 5/1988 | Bisenius . |
| 5,757,179 | 5/1998 | McCurley . |

*Primary Examiner*—Walter Snow
(74) *Attorney, Agent, or Firm*—Alvin Wirthlin; Mark P. Bourgeois; Mark W. Borgman

(57) ABSTRACT

A position sensor comprises a rotor and shaft connected to a housing for rotation about a rotational axis. A sensor base is fixedly connected to the housing and is spaced from the rotor. A Hall-effect sensor is fixedly connected to the sensor base, and a magnet is connected to the rotor for rotational movement therewith. The magnet has an upper polarized surface that faces the magnetic sensor to thereby generate a magnetic field coincident with the magnetic sensor. The polarized surface is semi-parabolic in shape to form a variable gap between the magnetic sensor and the polarized surface as the shaft and rotor are turned about the rotational axis to thereby vary the strength of the magnetic field at the magnetic sensor. With this arrangement, the strength of the magnetic field sensed by the magnetic sensor is indicative of the amount of relative movement between the rotor and the housing.

26 Claims, 6 Drawing Sheets

ROTARY POSITION SENSOR HAVING A SEMI-PARABOLIC MAGNET

BACKGROUND OF THE INVENTION

1. Field of the Invention

This invention relates generally to position transducers, and more particularly to non-contact position transducers with Hall-effect position sensing.

2. Description of the Related Art

Prior art position transducers include a shaft that pivots or rotates with respect to a stationary housing. The shaft is typically connected to a wiper mechanism that brushes against a resistor strip when the shaft is rotated. The wiper mechanism, when rotated, causes a change in electrical resistance to thereby indicate the relative rotational position of the shaft with respect to the housing. Although relatively inexpensive in construction, position transducers of this type are subject to wear due to the sliding effect of the wiper against the resistor strip. Worn parts may result in mechanical breakdown of the transducer or, at the very least, inaccurate position sensing.

In an attempt of overcome such problems, contactless position sensors have been developed. Such position sensors include inductively coupled ratio detectors, capacitively coupled ratio detectors, optical detectors using the Faraday effect, photo-activated ratio detectors, radio wave directional comparators, and electrostatic ratio detectors, among others. These position sensors tend to offer much value for one or more applications, but none meet all application requirements for all position sensing applications. The limitations may be due to high cost, sensitivity to particular energies or fields, instability, resistance to contamination and environment, ruggedness, linearity, precision, and so on.

SUMMARY OF THE INVENTION

According to the invention, a position transducer comprises a stationary member, a movable member spaced from the stationary member and being displaceable with respect to the stationary member, a magnetic sensor fixedly connected to the stationary member, and a magnet connected to the movable member for movement therewith. The magnet has a polarized surface (positive or negative) that faces the magnetic sensor to thereby generate a magnetic field coincident with the magnetic sensor. The polarized surface is shaped to form a gap between the magnetic sensor and the polarized surface that varies as the movable member is displaced with respect to the stationary member to thereby vary the strength of the magnetic field at the magnetic sensor. With this arrangement, the strength of the magnetic field sensed by the magnetic sensor is indicative of the amount of relative movement between the stationary member and the movable member.

Further according to the invention, an angular position sensor comprises a housing, a rotor connected to the housing for rotation about a rotational axis, a sensor base fixedly connected to the housing and spaced from the rotor, a magnetic sensor fixedly connected to the sensor base, and a magnet connected to the rotor for movement therewith. The magnet has a polarized surface that faces the magnetic sensor to thereby generate a magnetic field coincident with the magnetic sensor. The polarized surface is shaped to form a gap between the magnetic sensor and the polarized surface that varies as the rotor is rotated with respect to the stationary member to thereby vary the strength of the magnetic field at the magnetic sensor. With this arrangement, the strength of the magnetic field sensed by the magnetic sensor is indicative of the amount of relative movement between the rotor and the housing.

Other objects, advantages and features of the invention will become apparent upon reading the following detailed description and appended claims, with reference to the accompanying drawings.

BRIEF DESCRIPTION OF THE DRAWINGS

The preferred embodiments of the present invention will hereinafter be described in conjunction with the accompanying drawings, wherein like designations denote like elements throughout the drawings, and wherein.

It is noted that the drawings of the invention are not to scale. The drawings are merely schematic representations, and are not intended to portray specific parameters of the invention. The drawings are intended to depict only typical embodiments of the invention, and therefore should not be considered as limiting the scope of the invention. The invention will now be described with additional specificity and detail with particular reference to the accompanying drawings.

DETAILED DESCRIPTION OF THE PREFERRED EMBODIMENT

Figure 1:
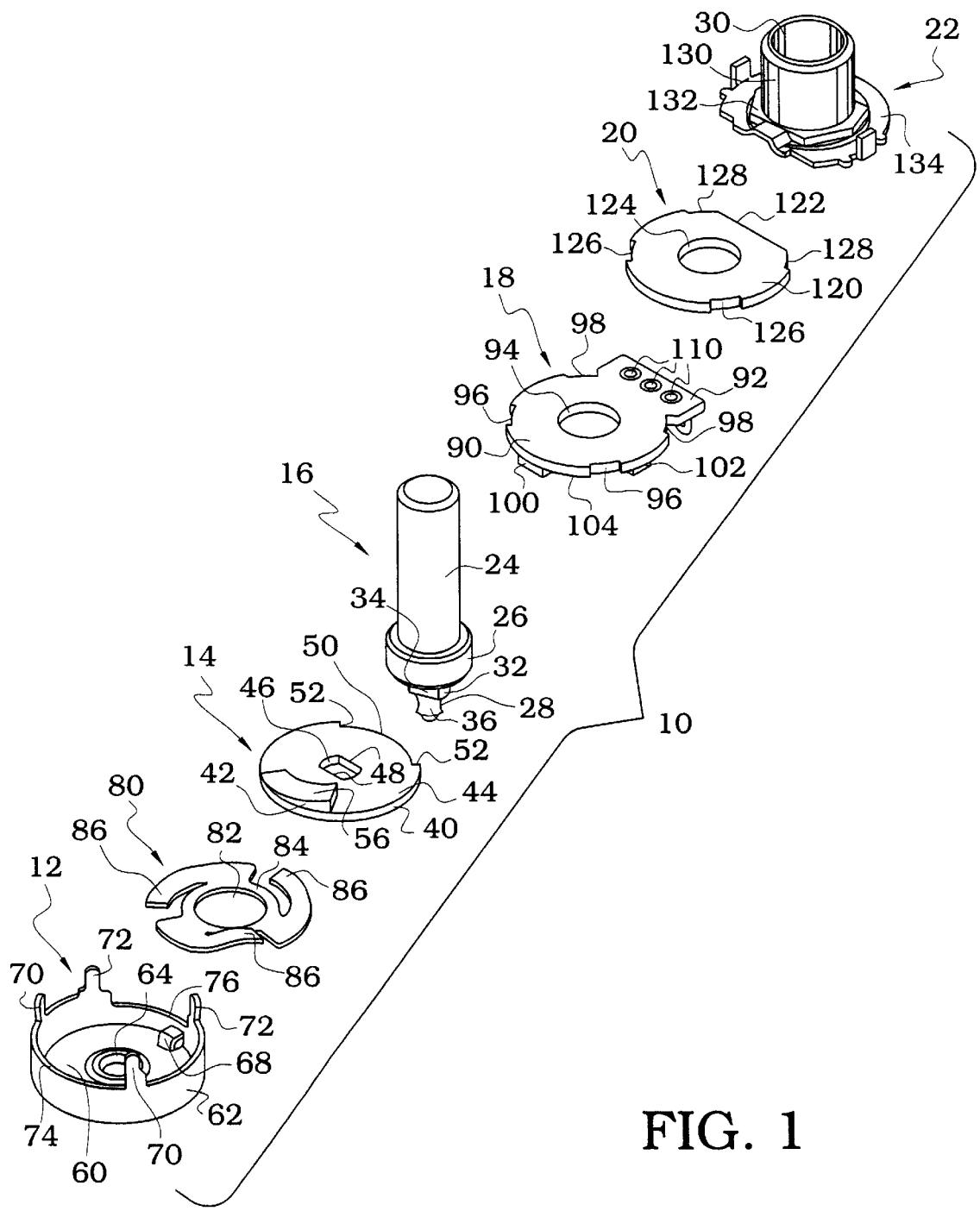
FIG. 1 is an exploded isometric view of a position transducer according to the invention.
Figure 2:
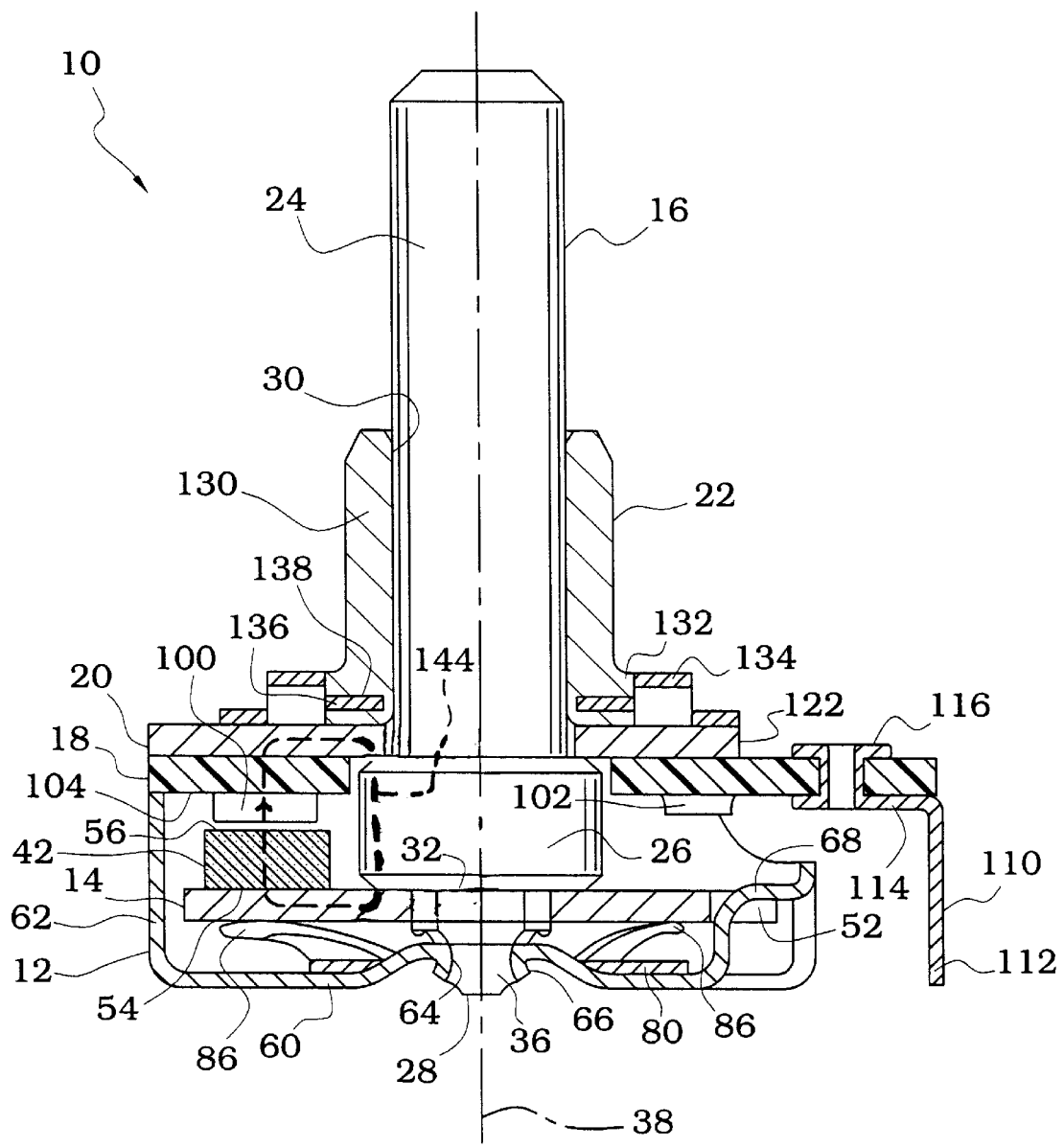
FIG. 2 is a cross sectional assembly view of the transducer of FIG. 1.

Referring now to the drawings, and to FIGS. 1 and 2 in particular, a position transducer 10 according to the present invention includes a housing 12, a rotor 14 and shaft 16 mounted for rotation in the housing 12, and a sensor module 18, a pole piece 20 and bushing assembly 22 fixedly mounted to the housing 12.

The shaft 16 includes an upper shaft portion 24 projecting upwardly from an annular flange 26, and a lower shaft portion 28 projecting downwardly from the annular flange. Annular flange 26 is made of a ferrous material. The upper shaft portion 24 is preferably cylindrical in shape and is sized to be rotatably received within a central bore 30 of the bushing assembly 22. The lower shaft portion 28 includes a boss 32 with flat surfaces 34, and a post 36 that extends downwardly from the boss 32. The shaft 16 is preferably formed from a single piece of material, such as metal bar stock, through turning and other machining operations.

Alternatively, the different components of the shaft may be separately formed and attached together through welding or other well-known joining techniques. Instead of metal, the shaft 16 may be constructed of a molded or machined magnetic plastic material.

The rotor 14 includes a disk 40 and a magnet 42 mounted to an upper surface 44 of the disk. A central opening 46 is formed in the disk 40 and is coincident with a rotational axis 38 of the rotor. The central opening 46 includes a pair of flat surfaces 48 that mate with the flat surfaces 34 of the boss 32. In this manner, the rotor 14 is connected to the shaft 16 for rotation therewith. The rotor may be press-fit, welded, or otherwise attached to the shaft in a well-known manner. The disk 40 also includes a reduced diameter portion 50 that forms a pair of stops 52 for limiting the amount of disk rotation when the rotor 14 is mounted in the housing 12. The disk 40 is preferably constructed of a ferrous metal or other magnetically permeable material and is in contact with the shaft 16.

The magnet 42 extends parallel with the outer perimeter of the disk 40 such that an arcuate center of the magnet 42 is coincident with the rotational axis 38. Preferably, the arc length of the magnet 42 is substantially equal to the circumferential distance between the stops 52. The magnet 42 includes a flat lower surface 54 that is in contact with the upper surface 44 of the disk and an upper surface 56 that is semi-parabolic in shape. The magnet 42 is preferably constructed of an injection-molded polymer-bonded ferrite material. After curing and prior to releasing the magnet 42 from the mold, the magnet is preferably charged in situ such that the upper surface 56 has a north or south pole and the lower surface 54 has the opposite polarity.

The housing 12 is cup-shaped in configuration and includes a bottom wall 60 and a continuous side wall 62 that extends upwardly from the bottom wall. Preferably, the housing 12 is stamped and formed from a single piece of sheet metal, but may be constructed of a molded polymer material. An opening 64 is formed in the bottom wall 60 and is bordered by an annular flange 66 that extends downwardly from the bottom wall 60. The post 36 of the shaft 16 is received in the opening 64 adjacent the annular flange 66. Preferably, the annular flange 66 is similar in shape to the post 36 to thereby limit the shaft to rotational movement about the rotational axis 38. A stop block 68 extends inwardly from the side wall 62 and upwardly from the bottom wall 60. The stop block 68 is preferably formed from a portion of the side wall 62 and bottom wall 60, but may be separately formed and attached to the housing 12. The stop block 68 is positioned between the stops 52 to thereby limit rotational movement of the shaft 16 and rotor 14 when one of the stops contacts the stop block. A pair of front securing tabs 70 and a pair of rear securing tabs 72 extend upwardly from an upper peripheral edge 74 of the sidewall. The front and rear securing tabs are preferably ductile in nature. A depression 76 is formed in the side wall 62 between the rear securing tabs 72. The purpose of the securing tabs and the depression will be described in greater detail below.

An annular leaf spring 80 is positioned between the bottom wall 60 of the housing 12 and the rotor 14 for biasing the annular flange 26 of the shaft 16 against the pole piece 20. The spring 80 preferably includes a central opening 82 formed in a spring base 84 and spring fingers 86 that bend upwardly from the spring base. Leaf spring 80 is in contact with bottom wall 60. The spring fingers 86 contact the rotor 14. In this manner, the rotor 14 is in constant magnetic contact with the annular flange 26 and the annular flange is in magnetic contact with pole piece 20.

The sensor module 18 is preferably constructed of circuit board material and includes an annular sensor portion 90 and a connector portion 92. The sensor portion 90 includes a central opening 94, front grooves 96, and rear grooves 98. The annular flange 26 of the shaft 16 extends through the central opening 94, while the front and rear securing tabs 70 and 72 extend through the front and rear grooves 96 and 98, respectively. A Hall-effect sensor 100 together with signal conditioning electronics 102 are positioned on a lower surface 104 of the sensor portion 90. The signal conditioning electronics may include an amplifier, filter, or other well known means for modifying the signal from the sensor 100.

The connector portion 92 includes three L-shaped terminals 110. Each terminal 110 includes a generally vertical leg 112 and a generally horizontal leg 114 that extends from an upper end of the leg 112. Electrical wires or connectors (not shown) may be attached to each leg 112 in a well-known manner. Each leg 114 includes an eyelet 116 that is mounted to the connector portion 92 for securing the terminals 110 thereto. The legs 114 are electrically connected to the sensor 100 for supplying current to the sensor and for receiving measurement signals therefrom. When the sensor module 18 is assembled to the housing 12, the lower surface 104 of the sensor module is supported by the upper peripheral edge 74 of the housing, while the depression 76 in the housing provides clearance for the legs 114 and the eyelets 116.

The pole piece 20 is constructed of a ferrous metal or other magnetically conductive material and is preferably arranged as an annular disk 120, with the exception of a flat or truncated section 122 at the rear of the disk. The truncated section 122 provides clearance for the eyelets 116 when the device 10 is assembled. The pole piece 20 includes a central opening 124, front grooves 126, and rear grooves 128. The upper shaft portion 24 extends through the central opening 124, while the front and rear securing tabs 70 and 72 of the housing 12 extend through the front and rear grooves 126 and 128, respectively, of the pole piece 20.

The bushing assembly 22 includes a bushing 130 with a lower flange portion 132 and a ground plate 134 mounted to the lower flange portion 132. As shown most clearly in FIG. 2, the ground plate 134 includes an inner annular flange 136 that fits within an annular slot 138 of the lower flange portion 132. The bushing 130 and the ground plate may be constructed of metals or polymer materials. When assembled, the securing tabs 70, 72 of the housing 12 are bent over the ground plate 134 to thereby secure the transducer components together.

As shown in FIG. 2, a magnetic circuit is created by the above-described arrangement, wherein numeral 144 represents the magnetic flux direction when the upper surface 56 and the lower surface 54 are of opposite polarity. Since the pole piece 20, annular flange 26 and rotor 14 are magnetically conductive, the circuit 144 of the magnet 42 is completed to thereby maintain efficient operation of the magnet. Since the housing 12 and bushing 130 are located outside of the magnetic circuit 144, they may be constructed of non-conductive materials. The hall effect sensor 100 is selected to detect the desired magnetic flux.

Figure 3:
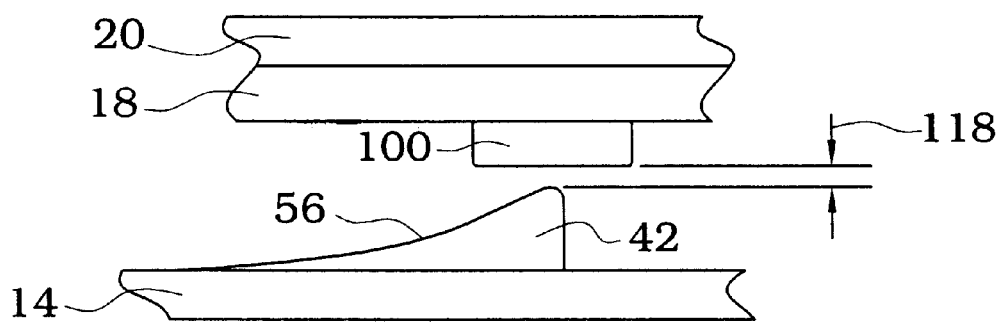
FIG. 3 is an side elevational view of a portion of a position transducer according to the invention with a rotor and magnet in a first position.
Figure 4:
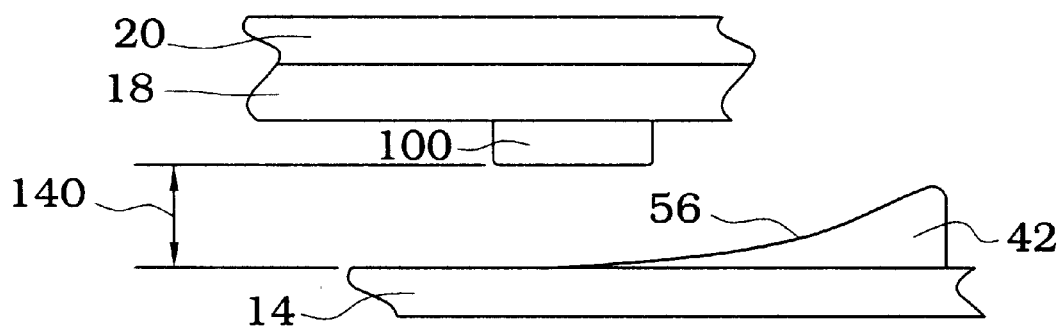
FIG. 4 is a view similar to FIG. 3 with the rotor and magnet in a second position.

In operation and with further reference to FIGS. 3 and 4, mutual rotation between the housing 12 and rotor 14 about the rotational axis 34 causes the magnet 42 to rotate between the FIG. 3 position and the FIG. 4 position with respect to the Hall-effect sensor 100. In the FIG. 3 position, the gap 118 between the upper surface 56 of the magnet 42 and the sensor 100 is at a minimum. Accordingly, a relatively strong magnetic field is coincident with the Hall-effect sensor 100.

In the FIG. 4 position, the gap 140 between the upper surface 56 of the magnet 42 and the sensor 100 is at a maximum. Accordingly, a weaker magnetic field is coincident with the Hall-effect sensor 100. As the magnet 42 rotates from the FIG. 3 to the FIG. 4 position, the magnetic field present at the sensor 100 becomes progressively weaker. Preferably, the upper surface 56 is shaped to create a linear change in magnetic field strength at the sensor 100 during movement of the magnet with respect to the sensor. The particular shape of the upper surface 100 may vary depending on the strength of the magnet, the particular type of sensor used, and other factors. The length of the magnet 42 as well as the distance between the stops 52 may be increased or decreased, depending on the amount of rotational movement to be detected.

Figure 5:
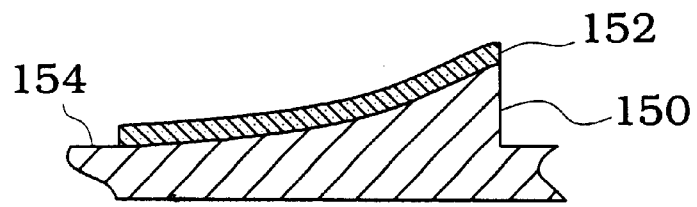
FIG. 5 is a cross sectional view of a portion of a rotor assembly according to a further embodiment of the invention.

With reference now to FIG. 5, a portion of a rotor 150 and magnet 152 according to a further embodiment of the invention is illustrated. The rotor 150 is similar in construction to the rotor 14 previously described, with the exception that an upper surface 154 of the rotor that receives the magnet 152 is semi-parabolic in shape, while the magnet 152 is substantially constant in thickness. With this arrangement, construction costs associated with the magnet can be reduced, while maintaining desired performance characteristics.

Figure 6:
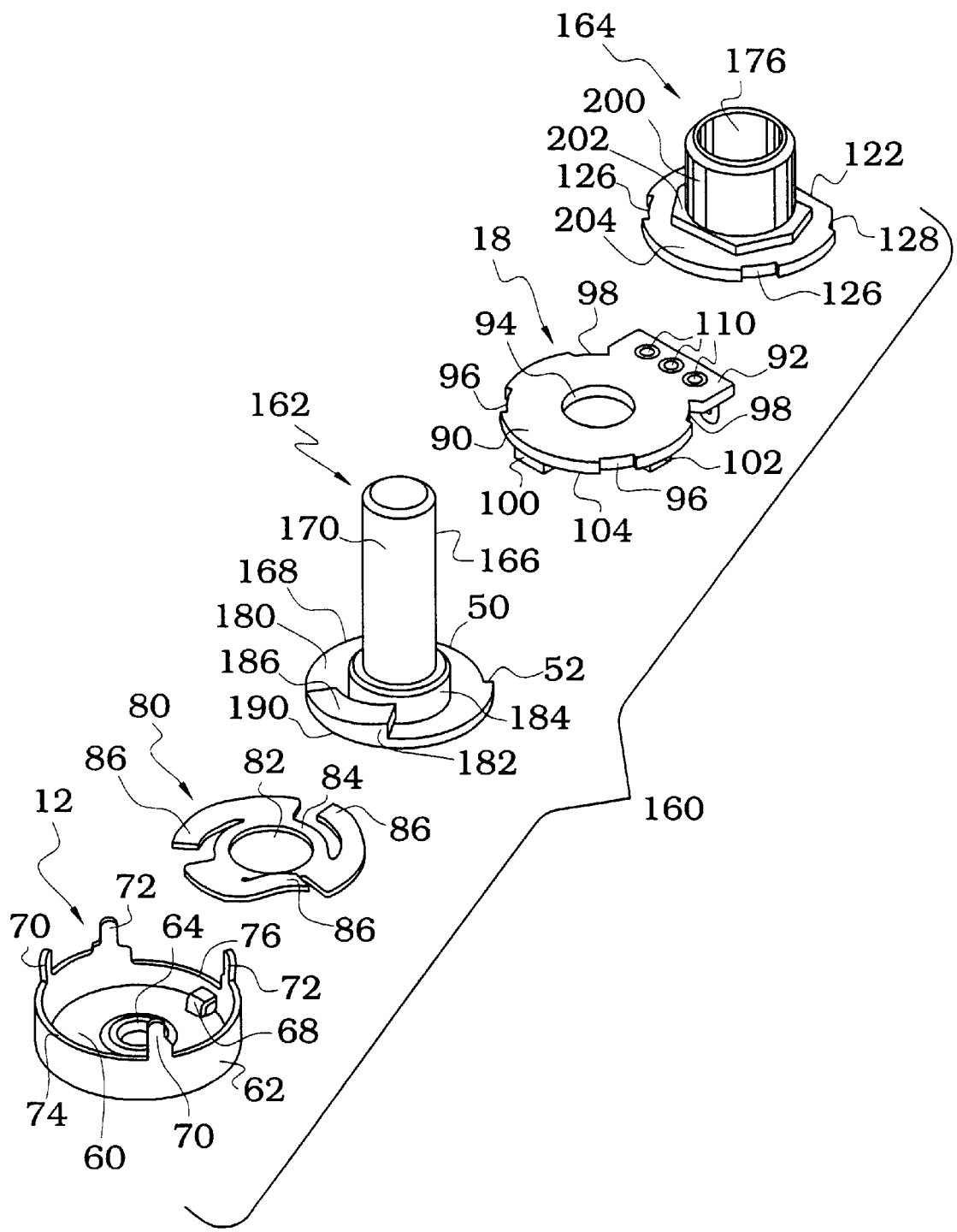
FIG. 6 is an exploded isometric view of a position transducer according to a further embodiment of the invention.
Figure 7:
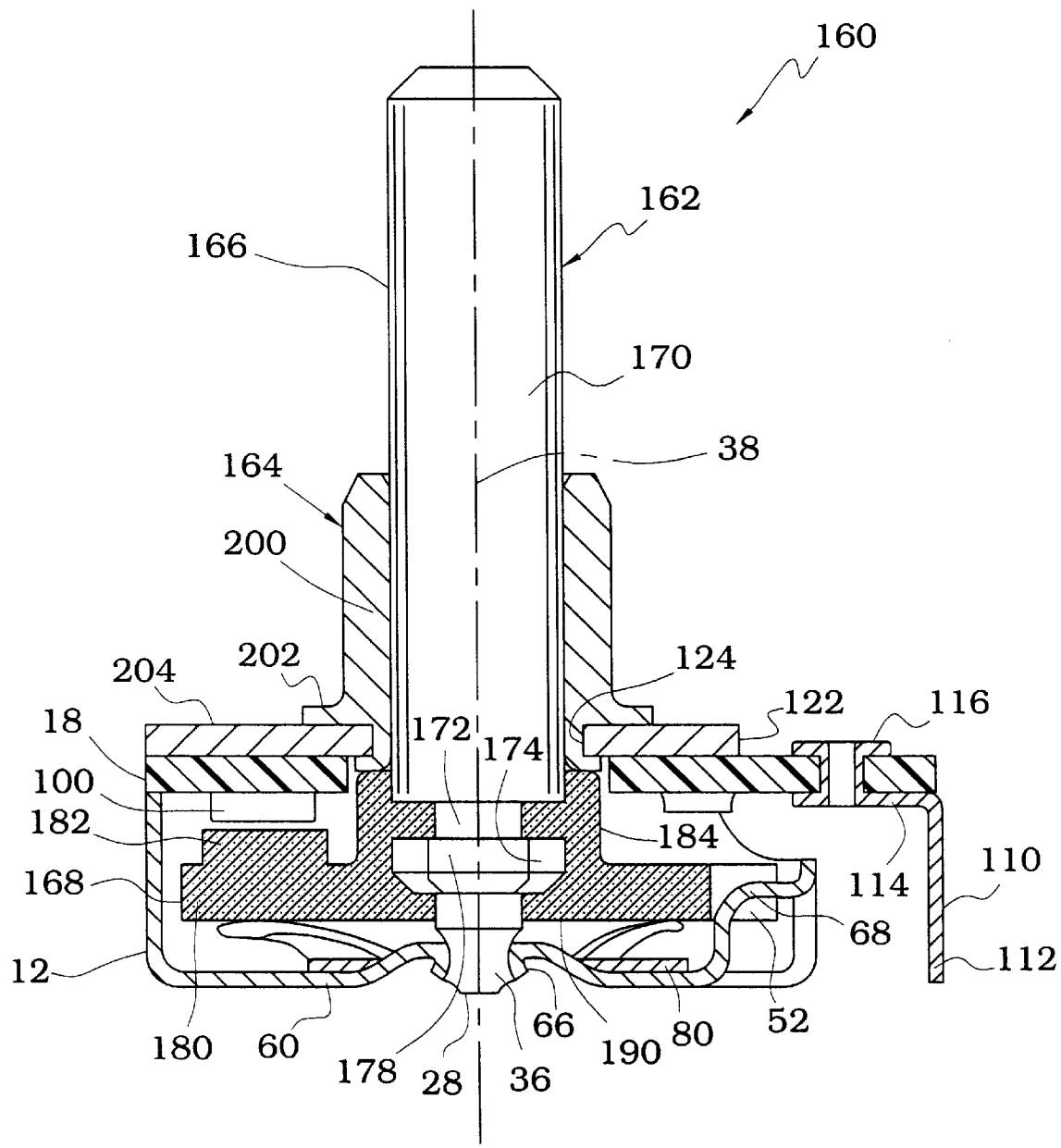
FIG. 7 is a cross sectional assembly view of the transducer of FIG. 6.

Turning now to FIGS. 6 and 7, a position transducer 160 according to a further embodiment of the invention is illustrated, wherein like parts in the previous embodiment are represented by like numerals. The position transducer 160 includes a rotor assembly 162 and a bushing assembly 164, together with the housing 12, leaf spring 80, and sensor base 18.

The rotor assembly 162 includes a shaft 166 that is integrally formed with a magnetic rotor 168. The shaft 166 includes an upper shaft portion 170 projecting upwardly from a lower shaft portion 172 of reduced diameter. As in the previous embodiment, the upper shaft portion 170 is preferably cylindrical in shape and is sized to be rotatably received within a central bore 176 of the bushing assembly 164. An annular flange 174 is formed on the lower shaft portion 172 and includes a pair of opposing flat surfaces 178 (only one of which is shown in FIG. 7).

The rotor 168 is similar in shape to the rotor 14 and magnet 42 previously described, and includes a disk 180 with an integrally formed protrusion 182 and collar 184. Preferably, the shaft 166 is insert-molded with the rotor 168 such that the lower shaft portion 172 and the annular flange 174 are embedded in the collar 184 and disk 180 to thereby form the integral rotor assembly 162. The opposing flat surfaces 178 on the annular flange 174 assure mutual rotation of the rotor 168 and shaft 166. The protrusion 182 is shaped similar to the magnet 42 previously described. Namely, the protrusion 182 extends parallel with the outer perimeter of the disk 180 such that an arcuate center of the protrusion 182 is coincident with the rotational axis 38. The protrusion 182 includes an upper surface 186 that is semi-parabolic in shape. Preferably, the disk 180, protrusion 182, and collar 184 are formed of an injection-molded polymer-bonded ferrite material. After curing and prior to releasing the rotor 168 and shaft 166 from the mold, the rotor 168 is preferably magnetically charged in situ such that an upper surface 188 of the disk 180 and the upper surface 186 of the protrusion 182 has a north or south pole and the lower surface 190 of the disk 180 has the opposite polarity.

The bushing assembly 164 includes a bushing 200 with a lower flange portion 202 and a pole piece 204 mounted to the lower flange portion 202. The pole piece 204 is similar in construction to the pole piece 20 previously described, including the truncated section 122, central opening 124, front grooves 126, and rear grooves 128. As shown most clearly in FIG. 7, the lower flange portion 202 surrounds the inner peripheral edge of the opening 124 to thereby fixedly secure the pole piece 204 to the bushing 200. Preferably, the pole piece 204 is constructed of ferrous metal or other magnetically conductive material.

Operation of the position transducer 160 is similar to the position transducer 10, and therefore will not be described in further detail. The position transducer 160 is advantageous over the other embodiment in that the number components are reduced, thereby leading to reduced inventory, labor, and cost.

Figure 8:
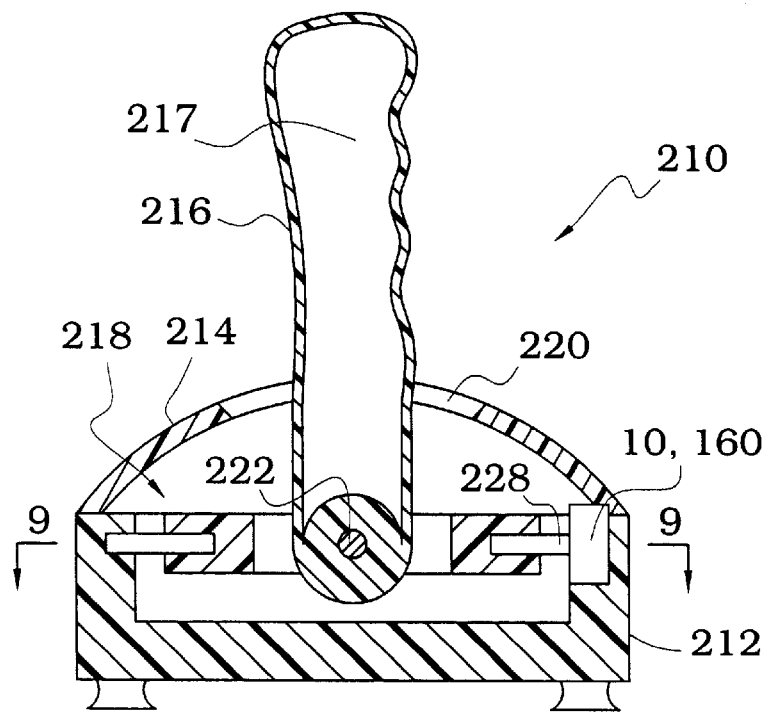
FIG. 8 is a side elevational view in partial cross section of a joystick employing position transducers according to the present invention.
Figure 9:
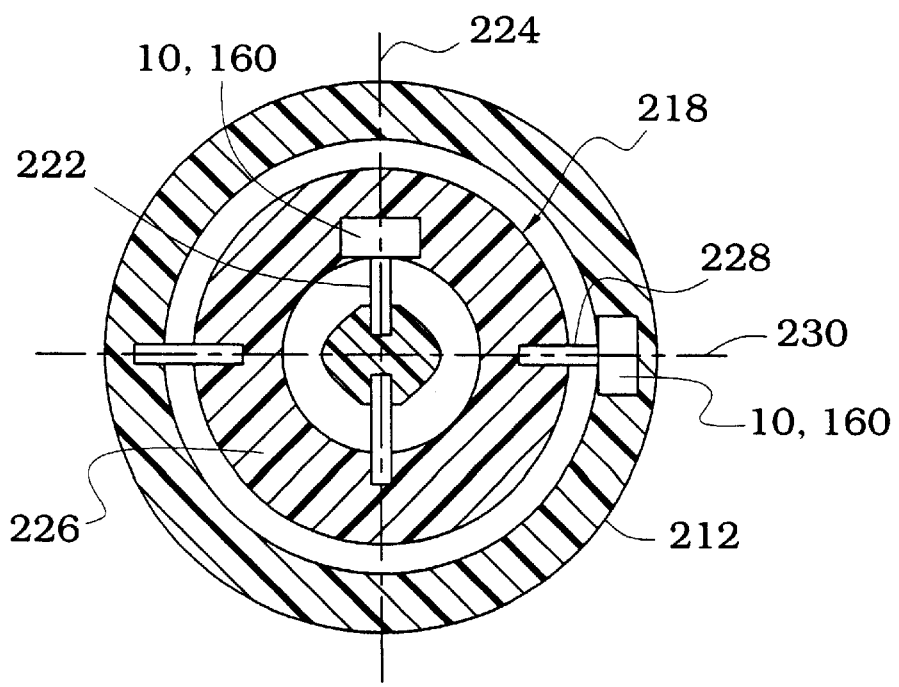
FIG. 9 is a cross sectional view of the joystick taken along line 9—9 of FIG. 8.

Turning now to FIGS. 8 and 9, a joystick 210 that incorporates one or more of the above-described position transducers 10, 160 is illustrated. The joystick 210 includes a base 212 and a cover 214 connected to the base. A control arm 216 includes an upper end with a hand gripping portion 217 and a lower end that is pivotally mounted to the base 212 through a gimbal assembly 218. The upper end of the control arm 216 extends through an opening 220 formed in the cover 214. The opening is preferably large enough to accommodate the desired range of tilting movement of the control arm 214 in all directions with respect to the base 212.

The gimbal assembly 218 includes a shaft 222 that is rigidly connected to the control arm 216 and pivotally connected to a ring 226 about a first axis of rotation 224 that is coincident with a longitudinal axis of the shaft 222. A shaft 228 is fixedly connected to the ring 226 and is pivotally connected to the base 212 to thereby pivotally connect the ring and the control arm 216 about a second axis of rotation 230 that is preferably perpendicular to the first axis of rotation 224 and coincident with a longitudinal axis of the shaft 228. In this manner, the pivot arm can rotate about both axes simultaneously to any angular position within preset limits. A position transducer (10 or 160) is located at the end of each shaft 222, 228 and mounted on the ring 226 and base 212 to thereby determine the orientation of the control arm with respect to the base 212. If desired, the upper shaft portions (16 or 168) may be substituted for each shaft 222, 228.

For a joystick that requires only a single axis of rotation, the gimbal assembly 218 may be replaced with a single position transducer with the transducer housing 12 fixedly connected to the base 212 and the transducer shaft fixedly connected to the pivot point of the control arm 215.

The joystick 210 has been described as one possible exemplary application for one or more of the position transducers 10, 160. It will be appreciated that the position transducers can be used in any application requiring the measurement of relative displacement between two objects, whether it be linear, rotational, or a combination thereof. When it is desirous to obtain linear measurements, the shaft of the transducer (10 or 160) can be connected to a wheel for rotating along a surface to be measured. Alternatively, the rotor and shaft in the above-described embodiments can be replaced with a slider or any other linearly translatable device that is connectable to an object to be linearly displaced.

It is to be understood that the terms upper, lower, vertical, horizontal, and their respective derivatives as may be used throughout the specification refer to relative, rather than absolute positions and/or orientations.

While the invention has been taught with specific reference to the above embodiments, those skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A position transducer, comprising:
   a stationary member;
   a movable member spaced from the stationary member and being displaceable with respect to the stationary member;
   a magnetic sensor fixedly connected to the stationary member; and
   a magnet connected to the movable member for movement therewith, the magnet having a semi-parabolic polarized surface that faces the magnetic sensor to thereby generate a magnetic field coincident with the magnetic sensor, the polarized surface being shaped to form a gap between the magnetic sensor and the polarized surface that varies as the movable member is displaced with respect to the stationary member to thereby vary the strength of the magnetic field at the magnetic sensor;
   wherein the strength of the magnetic field sensed by the magnetic sensor is indicative of the amount of relative movement between the stationary member and the movable member.

2. A position sensor according to claim 1, wherein the polarized surface is semi-parabolic in shape.

3. A position sensor according to claim 2, wherein the magnet is formed of an injection-molded polymer-bonded ferrite material.

4. A position sensor according to claim 1, and further comprising a housing, and wherein the stationary member is fixedly connected to the housing and the movable member is movably connected to the housing.

5. A position sensor according to claim 4, wherein the movable member includes a rotor mounted to the housing for rotation about a rotational axis.

6. A position sensor according to claim 5, wherein the magnet is integrally formed with the rotor.

7. A position sensor according to claim 6, wherein the rotor and magnet are formed of an injection-molded polymer-bonded ferrite material.

8. A position sensor according to claim 6, and further comprising a shaft fixedly connected to the rotor for rotation therewith.

9. A position sensor according to claim 8, wherein the shaft is insert-molded with the rotor during formation of the rotor and magnet.

10. A position sensor according to claim 5, and further comprising a shaft fixedly connected to the rotor for rotation therewith.

11. A position sensor according to claim 10, and further comprising a pole piece connected to the housing, the pole piece being electrically connected to the shaft and the rotor for forming a magnetic circuit with the magnet.

12. A position sensor according to claim 11, and further comprising a sleeve fixedly connected to the housing, with the shaft extending through the sleeve.

13. A position sensor according to claim 12, wherein the sleeve and pole piece are integrally connected.

14. A position sensor according to claim 5, wherein the rotor is disk-shaped, and further wherein the magnet extends parallel with an outer perimeter of the rotor such that an arcuate center of the magnet is coincident with the rotational axis.

15. An angular position sensor, comprising:
    a housing;
    a rotor connected to the housing for rotation about a rotational axis;
    a sensor base fixedly connected to the housing and spaced from the rotor;
    a magnetic sensor fixedly connected to the sensor base; and
    a magnet connected to the rotor for movement therewith, the magnet having a semi-parabolic polarized surface that faces the magnetic sensor to thereby generate a magnetic field coincident with the magnetic sensor, the polarized surface being shaped to form a gap between the magnetic sensor and the polarized surface that varies as the rotor is rotated with respect to the stationary member to thereby vary the strength of the magnetic field at the magnetic sensor;
    wherein the strength of the magnetic field sensed by the magnetic sensor is indicative of the amount of relative movement between the rotor and the housing.

16. An angular position sensor according to claim 15, wherein the polarized surface is semi-parabolic in shape.

17. An angular position sensor according to claim 16, wherein the rotor is disk-shaped, and further wherein the magnet extends parallel with an outer perimeter of the rotor such that an arcuate center of the magnet is coincident with the rotational axis.

18. An angular position sensor according to claim 17, wherein the magnet is formed of an injection-molded polymer-bonded ferrite material.

19. An angular position sensor according to claim 15, wherein the magnet is integrally formed with the rotor.

20. An angular position sensor according to claim 19, wherein the rotor and magnet are formed of an injection-molded polymer-bonded ferrite material.

21. An angular position sensor according to claim 19, and further comprising a shaft fixedly connected to the rotor for rotation therewith.

22. An angular position sensor according to claim 21, wherein the shaft is insert-molded with the rotor during formation of the rotor and magnet.

23. An angular position sensor according to claim 15, and further comprising a shaft fixedly connected to the rotor for rotation therewith.

24. An angular position sensor according to claim 23, and further comprising a pole piece connected to the housing, the pole piece being electrically connected to the shaft and the rotor for forming a magnetic circuit with the magnet.

25. An angular position sensor according to claim 24, and further comprising a sleeve fixedly connected to the housing, with the shaft extending through the sleeve.

26. An angular position sensor according to claim 25, wherein the sleeve and pole piece are integrally connected.

* * * * *